Figure 1:
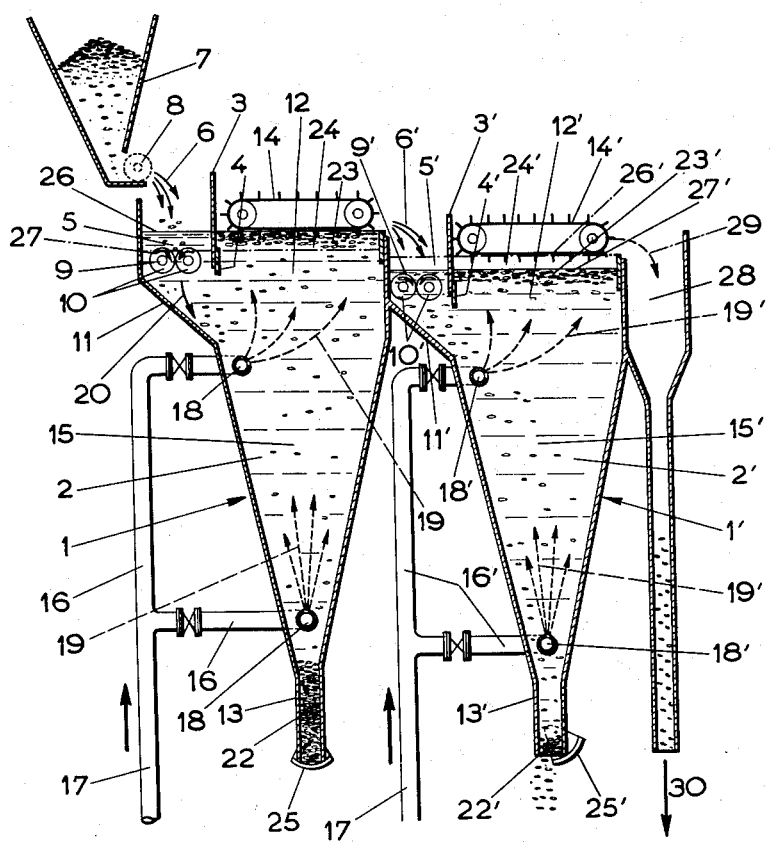

United States Patent Office 2,746,603
Patented May 22, 1956

2,746,603

SEPARATION OF SOLID SUBSTANCES OF DIFFERENT DENSITIES

Raymond Blondelle, Henin-Lietard, France, assignor to Compagnie de Fives-Lille pour Constructions Mecaniques et Entreprises, Paris, France, a French company Application May 20, 1952, Serial No. 288,868

Claims priority, application France May 29, 1951

5 Claims. (Cl. 209—172.5)

The present invention relates to a method of and apparatus for the separation of solid substances of different densities within a dense liquid suspension.

The present invention relates more particularly to the preparation of clean coal by the densimetrical separation of stony matter, schists, or other solid materials which are normally found in the products extracted from mines. It is applicable likewise to the enrichment of various ores accompanied by impurities having a density or densities different from that of the ores. More generally, the invention relates to a method of and apparatus for the treatment of any ores or for the separation of any solid substances of different densities by flotation of the lighter solid substances (hereinafter called floating substances) and sinking of the heavier solid substances (hereinafter called sinking substances) respectively on and to the bottom of a fluid medium constituted by a suspension in a liquid of a solid heavier than and not miscible with that liquid, the density of said fluid medium being intermediate between the densities of the solid bodies to be separated.

Although the invention applies particularly to the washing of coals and more especially to the washing of small coal known as "fines," it is clearly to be understood that it may be applied to the treatment of any ores or even to the separation of any solid substances of different densities by means of a suspension in a liquid (which is preferably water) of finely divided solid particles which are heavier than that liquid and insoluble therein, the density of the suspension being intermediate between the densities of the solid substances to be separated.

Heretofore numerous processes have been proposed for the separation of solid substances of different densities, based on the utilization of a homogeneous or heterogeneous dense liquor or suspension having a density intermediate between the extreme densities of the solid substances to be separated. In certain known processes utilizing a heterogeneous liquor a substantially constant density is maintained in the separation zone, by vigorous mechanical stirring of the liquor or with the aid of vertical or whirling currents. In other processes the suspension is allowed to be decanted freely, thus creating a density gradient in the zone of separation.

The present invention applies equally well to a dense homogeneous liquor as to a heterogeneous liquor and more particularly—but without limitation—to a suspension of finely ground magnetite in water. It is characterized by the utilization of a small amount of dense liquor, and consequently by very low consumption of dense products. It enables treatment at will of granular and fine products, because it eliminates the principal disadvantage of known processes, namely high consumption of substances utilized to produce the dense suspension or suspensions, which consumption is caused by the discharge of a considerable amount of liquor entrained by the sinking and floating substances.

The present invention affords excellent densimetric separation by the utilization of the general means consisting of effecting, in the sorting zone, vertical oscillatory movements or pulsations the intensity and frequency of which are both regulable.

A further object of the invention is to reduce the entrainment of dense suspension during the elimination of the sinking and floating substances to a minimum by systematically seeking a high concentration of the sinking substances in the bottom part and floating substances in the upper part of the separation vat.

In accordance with the invention, entrainment of dense liquor by the sinking substances is reduced to a minimum, while effecting good separation of the products of different densities, by intermittently evacuating the sinking substances accumulated at the bottom of the separation vessel through the bottom tapered part of the latter, this evacuation simultaneously also lowering the level of the suspension evacuation being stopped when a certain amount of sinking substances remains in the vat.

On the closing of said bottom, the level of the suspension again rises gradually in the vat, because the latter is fed continuously or intermittently with regenerated dense liquid and regularly receives the mixed solid products to be separated, which causes an accumulation of floating substances on the surface of the vat. When the level is sufficiently high, the floating substances come into contact with a mechanical extractor, which effects their discharge with the entraining of a minimum of dense liquor because of the concentration of the surface products.

Intermittent discharge of the sinking substances at the bottom of the separation vessel, as by the displacement of a flap, cause rising and falling movements inside the suspension, and even hammering. The vertical pulsations, regulated as a function of the characteristics of the solid substances to be separated, facilitate their densimetric sorting and avoid the formation of a special zone for the concentration of "border line" products inside the separation vessel.

The result is rapid and effective densimetric separation of solid substances in the sorting zone, the sinking products falling to the bottom and the floating substances rising to the surface of the vessel, while the sorting zone contains at any given moment only the minimum of solid substances to be separated, which is a considerable advantage over known processes.

In view of the method of discharge of the sinking substances and of the floating substances, which are of the essential characteristics of the invention, it will be seen that the minimum of dense suspension is entrained out of the vat with the solid substances separated. This result is very important particularly when it is desired to treat fine products, particularly coal "fines," the components of which, having a large surface in relation to their weight, have heretofore generally been extracted from the separating plant with a considerable amount of dense liquor when the latter does not itself serve as motive means for effecting their discharge.

In view of the small volume of suspension entrained out of the separating vessel, in accordance with the method forming the subject of the invention, it is possible, without expensive installation and expenditure of power, to purify carefully and continuously this small volume of suspension, by known processes, before returning it to the separation vessel. This careful purification permits the viscosity of the suspension to be maintained in operation at the low desired value by elimination of the liquid (generally water) while still charged with suspended substance (introduced with the product to be treated) and it avoids the usual disadvantage of dense liquid devices which limits their utilization and reduces their treatment capacity. This disadvantage is the progressive accumulation of mixed material and particularly of a suspended substance such as colloidal clay remaining in suspension, which clay increases the density of the sorting zone and makes the separation of the solid substances increasingly difficult; the result is a progressive increase in the proportion of "border-line" substances remaining in the sorting zone and retarding or even halting the sorting by density of the product to be treated which subsequently arrives in that zone.

From the foregoing there arises another advantage of the process forming the subject of the invention which is the possibility of treating relatively fine and moist products; the water introduced by the solid substances to be separated can easily be eliminated during the continuous regeneration of a considerable proportion of the small total volume of suspension utilized. The method can thus very satisfactorily be applied to the treatment of intermediate or mixed products obtained in the course of the preparation of the ores and coals by conventional processes.

In accordance with the invention, in order to separate the solid substances into two constituents of different densities, use is preferably made of a vat tapered towards the bottom and filled with a suspension or liquid the density of which corresponds substantially to the density of separation of the two categories of solid substances. The upper part of this vat may be divided into two unequal compartments by a vertical partition, forming a threshold which is advantageously regulable in height and leaving a passage beneath it. The primary compartment of smaller dimensions is disposed beneath the point of supply of solid substances to be separated. It may have a device, the construction of which is a function of the granulometry of the solid substances to be treated, the purpose of which is if desired to effect a good mechanical division of the particles to be separated and in all cases to impart to the products the impulse necessary for passing the threshold and for their introduction into the secondary compartment, to which the particles to be separated are transferred with a movement directed downwards, in a zone of dense liquid little charged with substances to be separated.

The secondary compartment of larger dimensions may comprise, in combination, an intermittent discharge valve, such as a swinging flap or arcuate gate disposed at its bottom end, dense liquor supply means preferably in the middle or sorting zone and in the form of nozzles directed upwards, and a discharge conveyor adapted to be disposed above the bottom part of the partition.

The separation of the solid substances takes place in the secondary compartment. Under the simultaneous action of gravity, light rising currents caused by the introduction of dense liquid to make up for the losses of dense liquid due to the discharge of the sinking and floating substances, and pulsations resulting from the operation of the discharge valve for the sinking substances, the products of lower densities than that of the dense medium rise towards the surface while the heavier products fall into the tapered bottom of the vat.

When it is desired to separate the substances to be treated into a number N of components differing from one another by their densities, use is made of N–1 vats, each containing a suspension of suitable density. If, for example, it is required to treat crude coals for the purpose of obtaining the three classified products; washings (or coal proper), mixed matter, and schists, use may be made of two vats according to the invention, one containing a suspension the density of which corresponds to that selected for the separation of schists, while the other contains a suspension the density of which characterises the cut between the washings and the mixed material. The sterile material is collected at the bottom of the second vat, and the coal proper at the top of the second vat.

In accordance with the invention, the secondary compartment of each vat comprises three zones: at the surface a zone very rich in floating substance, at the tapered bottom part a zone very rich in sinking substance and between these two zones a sorting or classifying zone formed principally by the dense liquor constituted by a suspension in a liquid of solid particles immiscible with said liquid. The separation by density of the product to be treated takes place in this latter zone. This separation is facilitated, in accordance with the invention, on the one hand by the vertical pulsations which are produced in that zone by the intermittent evacuation of the sinking substances at the bottom of the vat and the preferably simultaneous admission, at one or more points in this sorting zone, of dense liquor through upwardly directed nozzles, and on the other hand by the disintegrating device disposed in the primary compartment under the supply points for the mixed products to be treated, which device at the same time effects a mechanical disintegration of these products (which is particularly important when the material supplied is composed of wet fines that tend to agglomerate) and gives them a downwardly directed impulsion guiding the products along an inclined portion of the wall towards the sorting or classifying zone. Since the solid substances to be separated on arriving in the sorting zone of the secondary compartment, have a downwardly directed movement and the dense liquor is subjected in this compartment to vertical pulsations, the result is a rapid and effective separation by density of the solid substances in this sorting zone, the sinking substances falling to the bottom of the vat and the floating substances rising to the surface of the secondary compartment, so that at any given moment the sorting zone contains only the minimum of solid substances to be separated, which is a considerable advantage over known processes that entail an accumulation of dense substances in the sorting zone.

Figure 2:
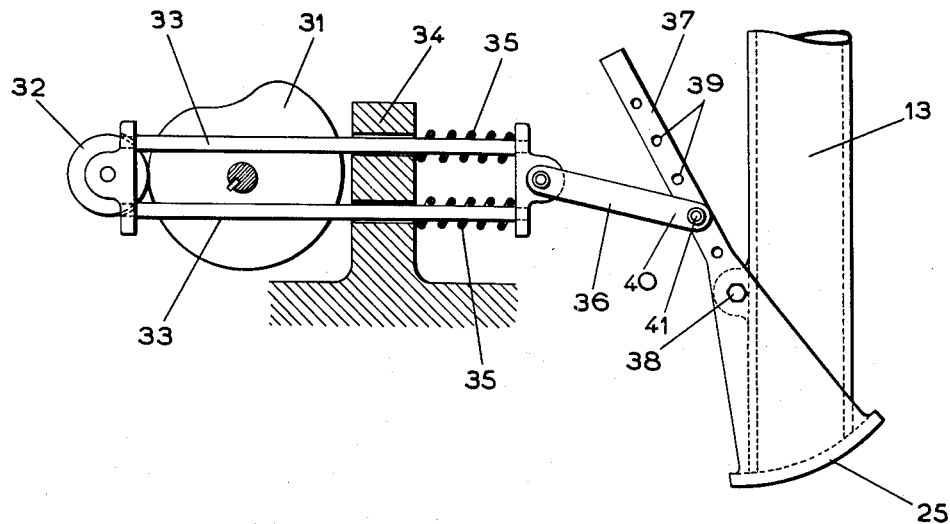

There will now be described, by way of illustration of the possibilities of performance of the invention and without in any way limiting the scope of the latter, one method of performance, given by way of example, in apparatus illustrated in the accompanying diagrammatic drawings, in which:

Figure 1 shows in vertical section a coal washing plant giving three products of increasing density: coal proper, middlings, and sterile matter, this washing plant having two vats in accordance with the invention; and Figure 2 illustrates a form of construction of the control device for a gate closing the bottom end of a vat according to the invention.

It is clearly to be understood that, for other separation work, the plant may comprise only a single vat, if it is desired to obtain only two products, for example an ore and its impurities.

The washing plant illustrated in Figure 1 comprises two identical vats 1 and 1'. The vat 1 is filled with a dense liquor 2, the density of which, intermediate between the density of the middlings and that of the schists, characterises the cut between the coal and the middlings on the one hand and the schists on the other hand, while the vat 1' is filled with a dense liquor 2', the density of which is lower than that of 2 and corresponds to the upper limit density of the constituents of the coal proper. Since the two vats are identical, the "prime" index (') has been added to the reference numerals of the elements of the second vat 1' corresponding to those of the first vat 1.

The vat 1, which is tapered towards the bottom as seen in the drawings, is divided into two compartments by a partition 3 comprising a regulable threshold 4. The primary compartment 5, of small dimensions, is disposed under the supply point 6 for the products to be treated, these products being supplied from a storage hopper 7 by a distributor 8. In the primary compartment 5 is located a disintegrator 9, constituted for example by two bladed wheels 10 turning in opposite directions and disposed just beneath the supply point 6 for the product to be treated. This disintegrator 9 serves a double purpose: it disintegrates or breaks up mechanically the mixed substance to be treated (which is above all important when the material supplied comprises wet fines) and it gives a downwardly directed impulsion to the mechanically disintegrated solids, so as to pass them beneath the regulable threshold 4, the inclination of the guiding wall 11 facilitating passage beneath the threshold 4 by directing the solid particles towards the secondary compartment 12.

This secondary compartment 12 terminates at its lower end in a narrowed part 13 closed by an arcuate gate 25 and comprises at its top part a mechanical extractor 14 of any suitable known kind, for example a scraper chain conveyor. In the middle zone 15 of this compartment 12 are located the ends of one or more pipes 16 for supplying dense liquor, of a density suitable for maintaining the density adopted for the secondary compartment; these pipes 16 may if desired be branches of a common main pipe 17. The pipe or pipes 16 end in one or more nozzles 18 having a regulable and directable aperture, which direct the dense liquor upwards, as illustrated by the arrows 19.

During the functioning of the plant, the supply 6 of the product to be treated from the hopper 7 through the distributor 8 takes place continuously. The dense liquor is supplied through the pipes 16 and introduced into the vat through the nozzles 18 either continuously or non-continuously, depending on circumstances. The disintegrator 9, which works constantly, separates the products to be treated and directs them downwards in accordance with the arrow 20. The products to be treated pass under the threshold 4 and, while the gate 25 is closed, are sorted in the separation zone 15 under the influence of gravity and the rising currents 19 of dense liquor into sinking substances 22 of density higher than that of the liquor 2 and into floating substances 23 of lower density than that of the liquor 2. The latter rise to the top 24 of the secondary compartment (on the right of the partition 3 in Figure 1), in view of the fact that the current 20 prevents them from being directed towards the primary compartment. The sinking substances 22 accumulate in the bottom tapered part 13 of the secondary compartment 12.

The gate 25 closing the bottom of the vat 1 is alternately opened and closed, the opening and closing being controlled by means such as a cam and lever device as illustrated in Figure 2, or by a suitable device (not shown) of any mechanical, pneumatic, or electrical type.

The device controlling the gate 25 illustrated by way of a non-limitative example in Figure 2 comprises a cam 31 acting on a roller 32 carried by a member 33 sliding in a fixed part 34. The roller 32 is held constantly against the surface of the cam 31 by springs 35 bearing against the fixed part 34. The sliding member 33, through the medium of a link 36, actuates the operating lever 37 of the gate 25.

The lever 37 is adapted to turn about a fixed point 38 and has a series of holes 39. A pin or bolt 41 passing through one of the holes 39 and through a hole provided in the end 40 of the link 36 connects that end to the lever 37. The link 36 may thus act on the lever 37 at different radii. It is thus possible to vary at will the degree of opening of the gate 25.

The speed of rotation of the cam 31 is regulable to control the frequency of the opening and closing of the gate 25, while the profile of said cam controls the relative duration of the open and closed periods of the gate.

The mode of operation of the vat 1' is identical: the dense liquor arrives continuously through ducts 16' (the liquor being directed upwards through the nozzles 18') and the products (the floating substances discharged from vat 1) arrive at the supply point 6' while the disintegrator 9' and conveyor 14' are operating.

In Figure 1, the vat 1 has been shown just before the opening of the gate 25 and the vat 1' just before the closing of the gate 25', but it is clearly understood that each vat effects the entire cycle which will now be described referring first to the left-hand vat 1 and then to the right-hand vat 1'.

The gate 25 is opened when a certain amount of sinking substances 22 has accumulated in the bottom part 13 of the tapered vat 1, as illustrated in the drawing in the case of the left-hand vat 1. During the opening of the flap 25, the sinking substances 22 leave the bottom part of the vat 1 in which they have accumulated, and the dense liquid 2 falls gradually or rapidly (depending on the regulation adopted for the movement of the flap) from the level 26 (shown in solid lines for the vat 1) to the level 27 (shown in dot-and-dash lines for the vat 1).

Referring now to the right-hand vat 1', the flap 25' is closed when the amount of sinking substances 22' remaining in the part 13' is small but preferably still compact. At that moment, the level of the liquid is at 27' (shown in solid lines). When the flap 25' is closed, the level of the dense liquid 2' rises gradually from 27' to 26' (shown in dot-and-dash lines for the right-hand vat 1') under the influence of the admission of dense liquor through ducts 16' and of the introduction, at supply point 6', of floating substances 23 from the first vat 1. When the liquid has reached the level 26', the discharge of the floating substances 23' by the conveyor 14' commences, and these substances pass into a receptacle 28 in accordance with the arrow 29.

Consequently, the product to be treated from the hopper 7 has been separated into three components: the sterile products, which were discharged through the gate 25 at the bottom of the first vat 1; the middlings, which were discharged through the gate 25' at the bottom of the second vat 1'; and the coal proper, which leaves the receptacle 28 in accordance with the arrow 30.

Between the two vats there may be interposed any type of conveyor or storage system. For example, a storage or buffer hopper similar to the hopper 7 may be disposed to receive the floating substances from the first vat, thus enabling the vat 1' to be fed continuously.

It will be clearly understood that the three products obtained are subsequently washed in such manner as to recover the small amount of dense liquor which they have entrained, the liquor being concentrated and carefully purified before being returned through the pipes 16 and 16' and the nozzles 18 and 18' into the vats 1 and 1.'

Separation takes place under very good conditions when the gates 25 and 25' cause effective pulsation in the sorting zones 15 and 15', this pulsation co-operating with the rising currents 19 and 19' and the downwardly directed entries 20 and 20' of the products to be separated.

According to the regulation adopted, the opening of the gates 25 and 25' effects inside the separation zones 15 and 15' a more or less violent descending current, and its closure may correspond to a hammering which breaks and cancels this current abruptly, giving rise to an opposite reaction which is favorable to the sorting of the products.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

What I claim is:

1. An apparatus for the separation of solid substances of different densities by flotation of the lighter of said substances on, and the sinking of the heavier substances within a liquid medium, the density of which is intermediate between the densities of the said lighter and heavier substances, comprising a vessel having a downwardly tapering body, the main portion of which forms a classifying zone, the upper portion of said vessel being divided into a feeding compartment and a collecting and discharge compartment for the light substances, said compartments being separated by a partition dividing said upper portion, means for supplying mixed heavier and lighter substances to the feed compartment, means for producing a downwardly directed current in the feed compartment passing below the partition dividing the compartments and for guiding said current into the classifying zone in the main portion of the vessel, a restricted outlet portion at the lower end of the tapering body, serving as a discharge compartment, means for supplying the classifying zone with a fluid medium, said means producing in the classifying zone upwardly directed currents, means for intermittently discharging from the bottom of the vessel to free atmosphere the heavier of the said substances, said discharges producing an intermittent lowering of the liquid level in the vessel below the discharge level and intermittent, downwardly directed fluid movements in the classifying zone, means for discharging the concentrated light substances, after separation by flotation, from the collecting and discharge compartment, when its level has risen during the intermittent fluctuations of the level, the classification of the solid substances being thus produced, by the alternatively downwardly and upwardly directed pulsatory movements in the vessel which are in their turn produced by the intermittent discharges from the vessel.

2. Flotation separating apparatus according to claim 1, wherein said means for supplying said liquid medium to said vessel comprises at least one duct opening into the interior of said vessel at a point spaced from the inner surface of its walls.

3. Flotation separating apparatus according to claim 2, wherein said means for supplying liquid medium to said vessel comprise at least one duct extending through a side wall of said vessel, and a regulable and directable nozzle on the end of said duct spaced from the inner surface of the walls of said vessel.

4. Apparatus for the separation of solid substances of different densities by flotation of the lighter of said substances on and by gravitational movement of the heavier of said substances to the bottom of a liquid medium, the density of which is intermediate between the densities of said lighter and said heavier substances, comprising in combination a vessel having a downwardly tapering bottom, a partition dividing the upper part of said vessel into two compartments, a passage between the two compartments below said partition, means for supplying said fluid medium to said vessel in the median zone thereof, means for supplying mixed lighter and heavier substances to one of the two compartments serving as the feed compartment, means for discharging the lighter of the substances when separated by flotation in said medium from the other of said compartments serving as a discharge compartment, means for intermittently discharging from the bottom of said vessel to the atmosphere the heavier one of said substances after their separation by their gravitational movement to the bottom of the liquid medium, said means for intermittently discharging the heavy substance to free atmosphere including in combination a pivoted gauge valve disposed at the bottom of said vessel, lever means turnable with said valve, a cam, a cam follower, and linkage means connecting said follower to said lever.

5. Apparatus for the separation of solid substances of different densities by flotation of the lighter one of said substances on and by gravitational movement of the heavier of said substances to the bottom of a liquid medium, the density of which is intermediate between the densities of said lighter and heavier substances, comprising in combination a vessel having a downwardly tapering bottom, a partition dividing the upper part of said vessel into two compartments, a passage between the two compartments below said partition, means for supplying said fluid medium to said vessels in the median zone thereof, means for supplying mixed lighter and heavier substances to one of said two compartments serving as a feed compartment, means for discharging the lighter one of said substances when separated by flotation in said medium from the other of said compartments serving as a discharge compartment, means for intermittently discharging from the bottom of the vessel to free atmosphere the heavier of said substances after separation by gravitational movement, said means for intermittently discharging the heavy substance to free atmosphere including a pivoted gauge valve disposed at the bottom of said vessel, lever means turnable with said valve, a cam, a cam follower, and linkage means connecting said follower to said lever, said linkage means being adjustable for determining the speed and degree of opening of said gauge valve in relation to the slope and amplitude of said cam.

References Cited in the file of this patent

UNITED STATES PATENTS

| | | |
|---|---|---|
| 231,429 | Jordan | Aug. 24, 1880 |
| 1,224,138 | Chance | May 1, 1917 |
| 1,545,636 | Chance | July 14, 1925 |
| 1,741,869 | Mett | Dec. 31, 1929 |
| 2,026,343 | De Vooys | Dec. 31, 1935 |
| 2,220,925 | Walker | Nov. 12, 1940 |
| 2,333,347 | Trostler | Nov. 2, 1943 |

FOREIGN PATENTS

| | | |
|---|---|---|
| 854,580 | France | Apr. 18, 1940 |